United States Patent
Jeon et al.

(10) Patent No.: US 11,563,798 B2
(45) Date of Patent: Jan. 24, 2023

(54) ELECTRONIC DEVICE FOR TRANSMITTING DATA SET TO SERVER AND CONTROL METHOD THEREFOR

(71) Applicant: SAMSUNG ELECTRONICS CO., LTD., Suwon-si (KR)

(72) Inventors: Kyungho Jeon, Suwon-si (KR); Timothy John Ebido, Suwon-si (KR); Kichul Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/521,594

(22) Filed: Nov. 8, 2021

(65) Prior Publication Data

US 2022/0070248 A1   Mar. 3, 2022

Related U.S. Application Data

(63) Continuation of application No. PCT/KR2020/010655, filed on Aug. 12, 2020.

(30) Foreign Application Priority Data

Sep. 19, 2019 (KR) .................. 10-2019-0115640
Jul. 21, 2020 (KR) .................. 10-2020-0090550

(51) Int. Cl.
| G06F 15/16 | (2006.01) |
| H04L 67/06 | (2022.01) |
| H04L 67/1097 | (2022.01) |
| H04L 67/01 | (2022.01) |
| H04L 67/561 | (2022.01) |

(52) U.S. Cl.
CPC .............. *H04L 67/06* (2013.01); *H04L 67/01* (2022.05); *H04L 67/1097* (2013.01); *H04L 67/561* (2022.05)

(58) Field of Classification Search
CPC ..... G06F 16/182; H04L 67/06; H04L 67/1097; H04L 67/2804; H04L 43/16
See application file for complete search history.

(56) References Cited

U.S. PATENT DOCUMENTS

| 7,382,737 B2 | 6/2008 | Matsugatani et al. |
| 9,503,847 B2 | 11/2016 | Chin et al. |

(Continued)

FOREIGN PATENT DOCUMENTS

| CN | 104133882 A | * 11/2014 | ....... G06F 17/30203 |
| CN | 102685159 B | 8/2016 | |

(Continued)

OTHER PUBLICATIONS

International Search Report (PCT/ISA/210) dated Nov. 11, 2020 issued by the International Searching Authority in International Application No. PCT/KR2020/010655.

(Continued)

*Primary Examiner* — Dustin Nguyen
*Assistant Examiner* — Hao H Nguyen
(74) *Attorney, Agent, or Firm* — Sughrue Mion, PLLC

(57) ABSTRACT

An electronic device includes a memory storing a first data set comprising a first plurality of files; a communicator comprising circuitry; and a processor configured to: identify an amount of files having a size less than a first threshold value among the first plurality of files; based on the identified amount of files and a communication state with a server, determine a size of a unit file to be transmitted to the server; convert the identified files having the size less than the first threshold value into the determined size unit, and generate metadata for the first data set while converting the identified files; and control the communicator to transmit the first data set including the converted files and the metadata for the first data set to the server.

9 Claims, 5 Drawing Sheets

(56) References Cited

U.S. PATENT DOCUMENTS

| | | | |
|---|---|---|---|
| 9,706,435 B2* | 7/2017 | Agiwal | H04W 28/06 |
| 9,715,502 B1 | 7/2017 | Manukonda | |
| 9,900,239 B2 | 2/2018 | Song et al. | |
| 10,887,372 B2* | 1/2021 | Jang | H04L 41/0681 |
| 2011/0271012 A1 | 11/2011 | Elliott | |
| 2015/0382235 A1* | 12/2015 | Min | H04W 52/0251 |
| | | | 370/230 |
| 2016/0316320 A1* | 10/2016 | Chin | H04W 4/029 |
| 2017/0026457 A1* | 1/2017 | Wei | H04N 21/2402 |
| 2018/0307471 A1* | 10/2018 | Raman | G06F 11/3466 |
| 2019/0149874 A1 | 5/2019 | Lau et al. | |
| 2020/0045100 A1* | 2/2020 | Rowny | H04L 67/1097 |

FOREIGN PATENT DOCUMENTS

| | | | | |
|---|---|---|---|---|
| CN | 105975493 A | * | 9/2016 | G06F 16/13 |
| JP | 2004280389 A | | 10/2004 | |
| JP | 2014029585 A | | 2/2014 | |
| KR | 1020020017406 A | | 3/2002 | |
| KR | 1020040051031 A | | 6/2004 | |
| KR | 101428034 B1 | | 9/2014 | |
| KR | 1020150045346 A | | 4/2015 | |
| KR | 1020170067438 A | | 6/2017 | |
| KR | 102006873 B1 | | 8/2019 | |

OTHER PUBLICATIONS

Written Opinion (PCT/ISA/237) dated Nov. 11, 2020 issued by the International Searching Authority in International Application No. PCT/KR2020/010655.

Haynes, B., et al., "PipeGen: Data Pipe Generator for Hybrid Analytics", SoCC, Oct. 5-7, 2016, pp. 470-483.

"Tf.data:Build TensorFlow input pipelines", TensorFlow Core, Oct. 1, 2021, pp. 1-71, http://www.tensorflow.org/guide/data.

"High-performance data management and storage suite", HDF5, The HDF Group, 2006, 6 pages.

* cited by examiner

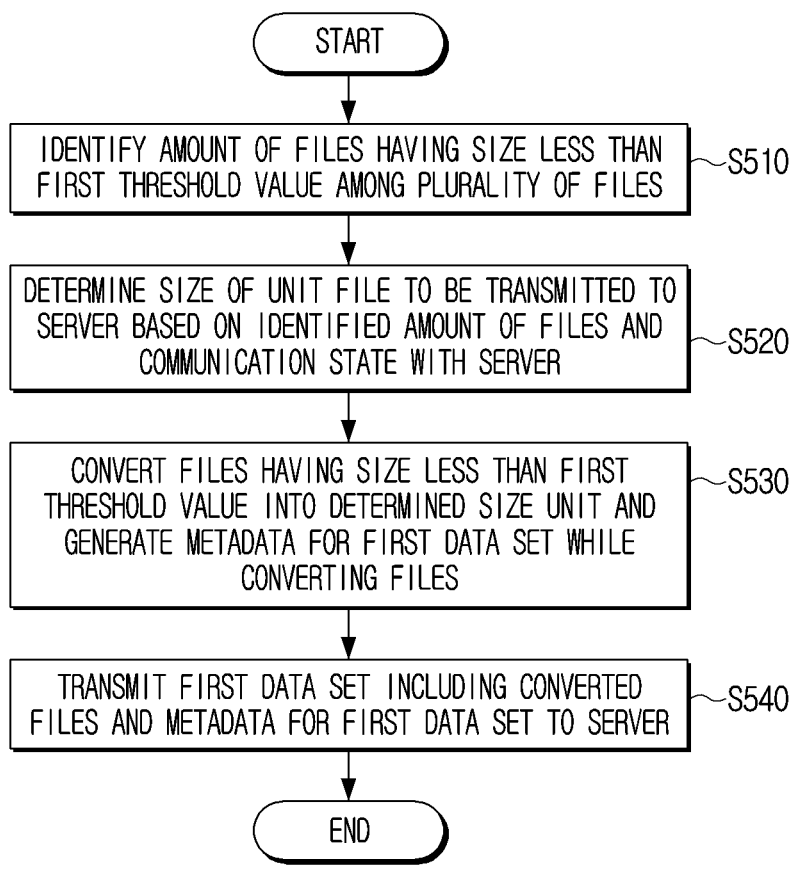

ELECTRONIC DEVICE FOR TRANSMITTING DATA SET TO SERVER AND CONTROL METHOD THEREFOR

CROSS-REFERENCE TO RELATED APPLICATION(S)

This application is a by-pass continuation application of International Application No. PCT/KR2020/010655, filed on Aug. 12, 2020, which is based on and claims priority to Korean Patent Application No. 10-2019-0115640, filed on Sep. 19, 2019, and Korean Patent Application No. 10-2020-0090550, filed on Jul. 21, 2020, in the Korean Intellectual Property Office, the disclosures of which are incorporated by reference herein in their entireties.

BACKGROUND

1. Field

The disclosure relates to an electronic device and a control method thereof, and more particularly relates to an electronic device which transmits a data set to a server based on a communication state with the server and a size of a file included in the data set, and a control method thereof.

2. Description of Related Art

Using communication technologies, users are able to upload various pieces of data to a server (or cloud) or download the data from the server by using various devices (personal computer (PC), a mobile device, and the like).

However, while performing the operation of uploading various pieces of data to the server or the operation of downloading various pieces of data from the server, an error may occur in the communication network, and in many cases, the operation of uploading or downloading the data needs to be repeated from a first point. When it is necessary to upload or download the data again due to the network error, if the size of the data is large, overhead generated when performing the operation of uploading or downloading may be enlarged in proportion thereto.

To address this problem, in the related art, a technology of dividing each of various pieces of data to pieces having a small size and uploading the data on the server or downloading the data from the server is used. However, in technology of the related art, it is assumed that the Internet is slightly unstable and slow is used when uploading the data on the server, and accordingly, a large-sized data is always divided to have a small size and transmitted.

In some cases, when transmitting the data to the server, not only the Internet, but also an internal network with a stable network state is frequently used, and a large amount of machine learning data materials are formed of a plurality of small files. Accordingly, there is a limit that the data is not able to be uploaded on the server or downloaded from the server efficiently through the technology of the related art.

SUMMARY

Provided are an electronic device which, based on sizes of a plurality of files included in the data set and a communication state with a server, transmits the files to the server by converting a part of the plurality of files, and a control method thereof.

According to an aspect of the disclosure, an electronic device may include a memory storing a first data set comprising a first plurality of files, a communicator comprising circuitry; and a processor configured to: identify an amount of files having a size less than a first threshold value among the first plurality of files; based on the identified amount of files and a communication state with a server, determine a size of a unit file to be transmitted to the server; convert the identified files having the size less than the first threshold value into the determined size unit, and generate metadata for the first data set while converting the identified files; and control the communicator to transmit the first data set including the converted files and the metadata for the first data set to the server.

The processor may be further configured to: identify whether the amount of files having the size less than the first threshold value among the first plurality of files is equal to or more than a second threshold value; and based on the amount of identified files exceeding the second threshold value, determine the size of the unit file to be transmitted to the server based on the communication state with the server.

The processor may be further configured to determine the size of the unit file to be transmitted to the server based on at least one of a bandwidth or a packet loss rate of a communication connection with the server.

The processor may be further configured to: determine the size of the unit file to be a value that is related to the bandwidth of the communication connection with the server; and determine the size of the unit file to be a value that is inversely related to the packet loss rate of the communication connection with the server.

The processor may be further configured to, based on the packet loss rate exceeding a third threshold value, control the communicator to transmit the first data set to the server without converting the files having the size less than the first threshold value.

The processor may be further configured to, based on the identified amount of files being equal to or less than the second threshold value, control the communicator to transmit the first data set to the server without converting the files having the size less than the first threshold value.

The metadata for the first data set may include at least one of a list of the converted files or a file format of the converted files of the first data set.

The processor may be further configured to control the communicator to transmit a signal for requesting a second data set comprising a second plurality of files to the server; receive the second data set and metadata for the second data set from the server via the communicator; and identify whether the second data set includes converted files based on the metadata for the second data set.

The processor may be further configured to, based on an identification that the second data set includes the converted files, convert the converted files into original files by using the metadata for the second data set.

According to another aspect of the disclosure, a method for controlling an electronic device including a memory storing a first data set including a plurality of files may include identifying an amount of files having a size less than a first threshold value among the plurality of files; based on the identified amount of files and a communication state with a server, determining a size of a unit file to be transmitted to the server; converting the identified files having the size less than the first threshold value into the determined size unit, and generating metadata for the first data set while converting the identified files; and transmitting the first data set including the converted files and the metadata for the first data set to the server.

The method may further include identifying whether the amount of files having the size less than the first threshold value among the plurality of files is equal to or more than a second threshold value; and based on the amount of identified files exceeding the second threshold value, determining the size of the unit file to be transmitted to the server based on the communication state with the server.

The determining may include determining the size of the unit file to be transmitted to the server based on at least one of a bandwidth or a packet loss rate of a communication method for communicating with the server.

The determining may include determining the size of the unit file to be a value that is related to the bandwidth of the communication method for communicating with the server; and determining the size of the unit file to be a value that is inversely related to the packet loss rate of the communication method for communicating with the server.

The method may further include based on the packet loss rate exceeding a third threshold value, transmitting the first data set to the server without converting the files having the size less than the first threshold value.

The method may further include, based on the amount of files being equal to or less than the second threshold value, transmitting the first data set to the server without converting the files having a size less than the first threshold value.

DESCRIPTION OF DRAWINGS

The above and other aspects, features, and advantages of certain embodiments of the disclosure will be more apparent from the following description taken in conjunction with the accompanying drawings, in which:

FIG. 5 is a flowchart illustrating a method for controlling an electronic device according to an embodiment.

DETAILED DESCRIPTION

Figure 1:
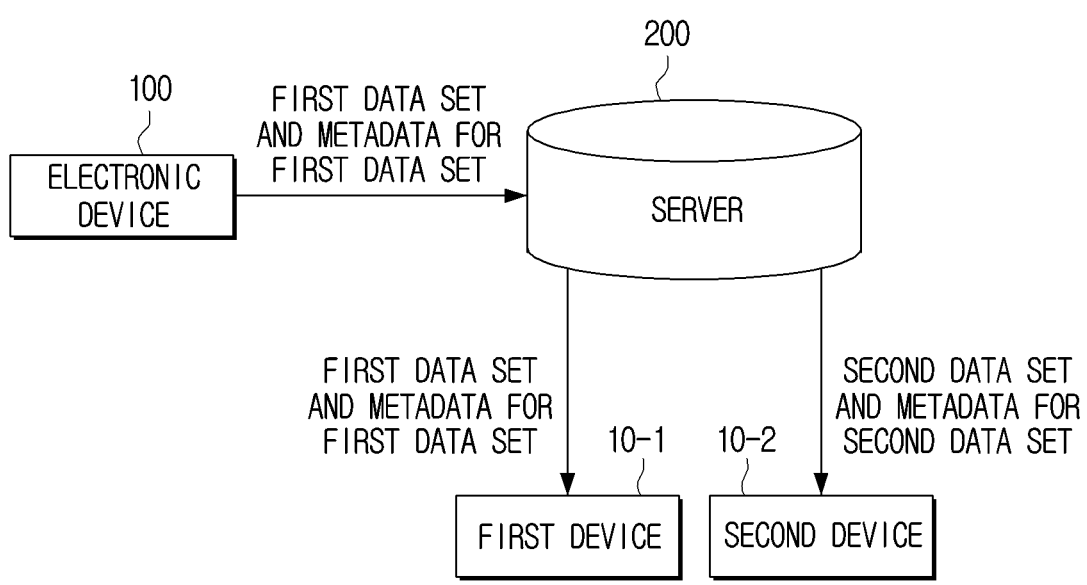
FIG. 1 is a diagram illustrating an operation between a plurality of electronic devices and a server according to an embodiment.

It should be noted that the accompanying drawings in the disclosure are not for limiting the technologies disclosed in this disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "include", "may include", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) only A, (2) only B, or (3) both A and B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

The disclosure relates to an electronic device which determines a size of a unit file to be transmitted to a server based on a communication state with the server and a size of a file included in a data set, in order to efficiently transmit various files to the server. The electronic device may efficiently upload data to the server by converting a file in the determined size unit and transmitting the data set including the converted file to the server. The electronic device may generate metadata for the data set while converting the file included in the data set, and transmit the data set including the converted file and the metadata to the server. Accordingly, various electronic devices which approach the server may identify whether the data set includes the converted file by using the metadata.

Hereinafter, the disclosure will be described in detail with reference to the drawings.

FIG. 1 is a diagram illustrating an operation between an electronic device 100 and a server 200 according to an embodiment.

The electronic device 100 may identify a number of files having a size less than a first threshold value among a plurality of files included in a first data set. If the size of the plurality of files included in the data set is extremely small, the electronic device 100 may not sufficiently use a bandwidth of a communication method connected to the server, when transmitting the small-sized file to the server. In order to sufficiently use the bandwidth of the communication method connected to the server, the electronic device 100 may convert (or compress) files having a size less than the first threshold value into one file. Accordingly, in order to determine whether to convert the files having a size less than the first threshold value, the electronic device 100 may identify the number of files having a size less than the first threshold value among the plurality of files. The first threshold value may be a value predetermined by a user or a measured value obtained through an experiment and may be corrected by the user.

The server 200 may be implemented as a cloud server, an application server, a web server, a computing server, a proxy server, a mail server, a database server, and the like managed by a manufacturer of the electronic device 100, but is not limited thereto, and may be implemented as various servers capable of storing various pieces of data.

The data set may refer to a set of various pieces of data. Specifically, the data set may refer to a set of pieces of data related to each other which are collected or stored so as to be used by various devices such as the electronic device 100 and the server 200. For example, the data set may include various types of learning data (e.g., image data, voice data, text data, and the like) necessary for training an artificial intelligence model included in various devices. The file may refer to a set of data collected by one object or rule. Accordingly, the data set may include (or store) various pieces of data in a form of file collected or combined according to a certain object or rule.

The electronic device 100 may determine a size of a unit file to be transmitted to the server 200 based on the identified number of files having a size less than the first threshold value and a communication state with the server 200. Specifically, the electronic device 100 may identify whether the identified number of files having a size less than the first threshold value among the plurality of files is equal to or more than a second threshold value. In the same manner as the first threshold value, the second threshold value may be a value predetermined by a user or a measured value obtained through an experiment and may be corrected by the user.

If the identified number of files is equal to or less than the second threshold value, the electronic device 100 may transmit the first data set to the server 200, without converting the files having a size less than the first threshold value. If the identified number of files does not exceed a certain number, the time taken for the electronic device 100 to convert (or compress) the files having a size less than the first threshold value into one file that may be longer than the time taken for transmitting the first data set directly to the server 200. Accordingly, if the identified number of files is equal to or less than the second threshold value, the electronic device 100 may transmit the first data set directly to the server 200, without converting the files having a size less than the first threshold value. Referring to FIG. 1, the electronic device 100 may transmit the first data set and the metadata for the first data set to the server 200 at the same time or within a threshold error range. In this case, the metadata for the first data set may include information indicating that the files included in the first data are not converted.

If the identified number of files exceeds the second threshold value, the electronic device 100 may determine the size of the unit file to be transmitted to the server 200 based on the communication state with the server 200. Specifically, the electronic device 100 may determine the size of the unit file to be transmitted to the server base on at least one of a bandwidth and a packet loss rate of the communication method connected to the server from the communication state with the server.

In an embodiment, if the bandwidth of the communication method connected to the server is large, the electronic device 100 may determine the size of the unit file to be transmitted to the server 200 as a large value. If the bandwidth of the communication method connected to the server 200 is large, the size of the file that the electronic device 100 is able to transmit during a unit time may be increased. Accordingly, the electronic device 100 may identify the bandwidth of the communication method connected to the server and determine the size of the unit file to be transmitted to the server 200 as a large value, if the identified size of the bandwidth is large.

In another embodiment, if the packet loss rate of the communication method connected to the server 200 is small, the electronic device 100 may determine the size of the unit file to be transmitted to the server 200 as a large value. The packet loss rate may refer to a rate of a packet that is not able to be transmitted to the server 200, when at least one or more data packets are transmitted to the server 200 by the communication method connected to the server 200. In other words, a large packet loss rate may refer to a high probability of retransmission of a file, since a probability of occurrence of an error is high while transmitting a file included in the first data set to the server 200. If the packet loss rate is large and the size of the unit file to be transmitted to the server 200 is large, there is a high probability that the electronic device 100 retransmits the file to the server 200 due to an error which may frequently occur, and accordingly overhead may additionally occur. Accordingly, the electronic device 100 may identify the packet loss rate of the communication method connected to the server 200, and determine the size of the unit file to be transmitted to the server 200 as a large value, as the identified packet loss rate is small.

If the identified packet loss rate exceeds a third threshold value, the electronic device 100 may transmit the first data set, without converting the file having a size less than the first threshold value. The electronic device 100 may transmit the first data set and the metadata for the first data set to the server 200 at the same time or within the threshold error range. In this case, the metadata for the first data set may include information indicating that the files included in the first data are not converted. The third threshold value may be a predetermined value, but it is merely an embodiment, and the third threshold value may be or a value measured through an experiment.

In another embodiment, the electronic device 100 may determine the size of the unit file to be transmitted to the server 200 by using pre-stored bandwidth classification data and packet loss rate classification data. For example, if the bandwidth of the communication method connected to the server 200 is a value more than a and equal to or less than b, the electronic device 100 may identify that the current bandwidth is a value belonging to a first group through the bandwidth classification data. In addition, the electronic device 100 may determine a first size value corresponding to the first group as the size of the unit file to be transmitted to the server 200.

In still another embodiment, if the bandwidth of the communication method connected to the server 200 is a value more than b and equal to or less than c, the electronic device 100 may identify that the current bandwidth is a value belonging to a second group through the bandwidth classification data. In addition, the electronic device 100 may determine a second size value corresponding to the second group as the size of the unit file to be transmitted to the server 200. In this case, the second size value may be more than the first size value. Accordingly, as the bandwidth value increases, the electronic device 100 may not only determine the size of the unit file to be large, but also determine the value corresponding to the range to which the current bandwidth belongs as the size of the unit file. In addition, the electronic device 100 may determine the value corresponding to the range to which the packet loss rate of the communication method connected to the server 200 belongs, as the size of the unit file by using the packet loss rate classification data.

The electronic device 100 may convert (e.g., compress or the like) the files having a size less than the first threshold value into the determined size unit. Specifically, the electronic device 100 may determine a file format for conversion according to the size of the determined unit file. For example, the electronic device 100 may convert the files having a size less than the first threshold value into a format of tar, zip, or the like according to the size of the determined unit file.

In addition, the electronic device 100 may determine that the size value of the unit file to be transmitted to the server 200 is a value that does not exceed a fourth threshold value. If the size of the unit file is extremely large when the electronic device 100 or another device downloads the first data set stored in the server 200, the downloading speed may increase or the packet loss rate may increase. Accordingly, although the bandwidth of the communication method connected to the server 200 is large and the packet loss rate is small, the electronic device 100 may determine the size of the unit file to be within values that do not exceed the fourth threshold value. The fourth threshold value may be a pre-determined value or may also be changed by the user.

In addition, the electronic device 100 may generate the metadata for the first data set while converting the files included in the first data set. Specifically, while converting the files included in the first data set, the electronic device 100 may obtain information on a format of the converted files and information on a list or the like of the converted files included in the unit file to be transmitted to the server 200. In addition, the electronic device 100 may generate the metadata for the first data set including the obtained information. Accordingly, the metadata for the first data set may include at least one of a list of the converted files and a file format of the converted files among the first data set. In addition, the metadata for the first data set may include information related to the first data set such as information on a data type of the first data set, a dimension of a data space, and the like.

Referring to FIG. 1, the electronic device 100 may transmit the first data set including the converted files and the metadata for the first data set to the server 200. In other words, the server 200 may store the first data set and the metadata for the first data set uploaded from the electronic device 100. The server 200 may include the information on the list of the files included in the first set. Since the files having a size less than the first threshold value among the plurality of files included in the first data set are converted into one file, the number of files included in the first data set may decrease. In other words, the server 200 may store the information on the list of the files included in the first data set having a small size. Accordingly, a load for managing the files included in the first data set decreases, and therefore, the server 200 may save resources and have enhanced performance when performing other operations.

The server 200 may store not only the first data set, but also a plurality of data sets received from another device and metadata for each of the plurality of data sets. Accordingly, the electronic device 100 and various devices may download and use various data sets and metadata for the data set stored in the server 200.

Referring to FIG. 1, a process in which a first device 10-1 and a second device 10-2 download data sets stored in the server 200 will be described. In this case, the first device 10-1 and the second device 10-2 may be the same device as the electronic device 100, and may also be implemented as a separate device from the electronic device 100, with no limitation.

The first device 10-1 may transmit a signal for requesting for the first data set including a plurality of files to the server 200. The first device 10-1 may receive a user command for transmitting the signal for requesting for the first data set to the server 200 from a user. The first device 10-1 may transmit the signal for requesting for the first data set to the server 200. In another example, if it is identified that the first data set is necessary to perform a specific operation, the first device 10-1 may transmit the signal for requesting for the first data set to the server 200.

When the signal for requesting for the first data set is received, the server 200 may transmit the first data set and the metadata for the first data set to the first device 10-1. In addition, the first device 10-1 may identify whether the first data set includes the converted files based on the metadata for the first data set. As described above, the metadata for the first data set includes the list of the converted files among the first data set, and accordingly, the first device 10-1 may identify whether the first data set includes the converted files through the metadata for the first data set.

If it is identified that the first data set includes the converted files, the first device 10-1 may convert the converted files into the original files by using the metadata for the first data set. Specifically, the first device 10-1 may convert the converted files into the original files by using the list of the converted files and the format of the converted files included in the metadata. In addition, the first device 10-1 may use the first data set converted into the original files by various methods. For example, if the first data set stores the learning data for training an artificial intelligence model in advance, the first device 10-1 may train a pre-stored artificial intelligence model by using the first data set converted into the original files. In another example, if the first data set stores data for reproducing various contents, the first device 10-1 may reproduce a content by using the first data set converted into the original files.

Referring to FIG. 1, the second device 10-2 may transmit a signal for requesting for a second data set stored in the server 200 to the server 200. In addition, the second device 10-2 may receive the second data set and metadata for the second data set received from the server 200. An operation in which the second device 10-2 identifies whether the second data set includes the converted files by using the metadata for the second data set is the same as the operation of the first device 10-1, and therefore, the overlapped description will not be repeated.

Figure 2:
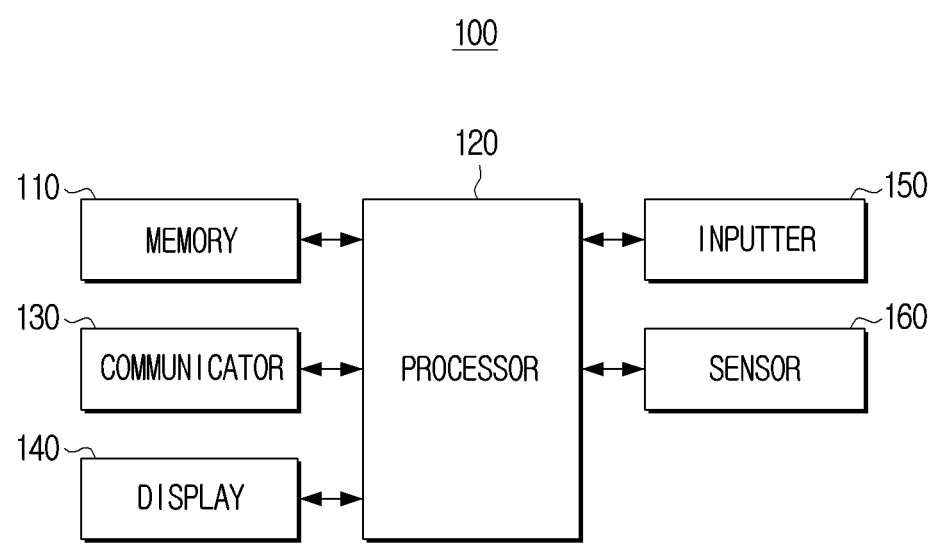
FIG. 2 is a block diagram illustrating a configuration of the electronic device according to an embodiment.

FIG. 2 is a block diagram illustrating a configuration and an operation of the electronic device 100 according to an embodiment. Referring to FIG. 2, the electronic device 100 may include a memory 110, a processor 120, a communicator 130, a display 140, an inputter 150, and a sensor 160. The configuration illustrated in FIG. 2 is merely an example for implementing embodiments and appropriate hardware and software configurations apparent to those skilled in the art may be additionally included in the electronic device 100.

The memory 110 may store a command or data related to at least another element of the electronic device 100. In addition, the memory 110 may be accessed by the processor 120 and reading, recording, editing, deleting, or updating of the data by the processor 120 may be executed. The memory 110 may include a non-volatile memory, a volatile memory, a flash memory, a hard disk drive (HDD), a solid-state drive (SSD), or the like. A term, memory, in the disclosure may include the memory 110, a ROM and a RAM (not illustrated) in the processor 120, or a memory card (e.g., micro SD card or memory stick) mounted on the electronic device 100. In addition, the memory 120 may store programs, data, and the like for configuring various screens to be displayed in a display area of a display.

Particularly, the memory 110 may store an instruction set corresponding to at least one program executable by the processor 120. The instruction may be one action statement executable directly by the processor 120 in a programming language and is a minimum unit of a program execution or operation.

The memory 110 may store a first data set including a plurality of files. In addition, the memory 110 may store metadata for the first data set generated while the processor 120 converts files having a size less than the first threshold value among the first data set.

In addition, the memory 110 may store the bandwidth classification data in which a bandwidth of a communication method connected to the server 200 is divided in a plurality of ranges according to the size. For example, the bandwidth classification data may include information indicating that the current bandwidth belongs to the first group, if the size of the current bandwidth is a value more than a and equal to or less than b, and information indicating that the current bandwidth belongs to the second group, if the size of the current bandwidth is a value more than b and equal to or less than c. The memory 110 may store packet loss rate classification data in which the packet loss rate of the communication method connected to the server 200 is classified in a plurality of ranges according to the size. For example, the packet loss rate classification data may include information indicating that the current packet loss rate belongs to a third group, if the size of the current packet loss rate belongs to a value more than d and equal to or less than e, and information indicating that the current packet loss rate belongs to a fourth group, if the size of the current bandwidth belongs to a value more than e and equal to or less than f. The information on the ranges of the data classification data and the packet loss rate classification data and the information on the group corresponding to each range may be determined variously according to a user command.

The processor 120 may be electrically connected to the memory 110 to control general operations and functions of the electronic device 100. Particularly, the processor 120 may identify the number of files having a size less than the first threshold value among the plurality of files. The processor 120 may determine the size of a unit file to be transmitted to the server 200 based on the identified number of files having a size less than the first threshold value and the communication state with the server 200.

Specifically, the processor 120 may identify whether the number of files having a size less than the first threshold value among the plurality of files is equal to or more than the second threshold value. If the number of files is equal to or less than the second threshold value, the processor 120 may control the communicator 130 to transmit the first data set to the server 200 without converting the files having a size less than the first threshold value. In this case, the processor 120 may control the communicator 130 to transmit the first data set along with the metadata for the first data set including information indicating that the files included in the first data set are not converted to the sever 200.

If the number of files exceeds the second threshold value, the processor 120 may determine the size of the unit file to be transmitted to the server 200 based on the communication state with the server 200. Specifically, the processor 120 may determine the size of the unit file to be transmitted to the server 200 based on at least one of the bandwidth and the packet loss rate of the communication method connected to the server 200 among the communication states with the server 200. For example, if the bandwidth of the communication method connected to the server 200 is large, the processor 120 may determine the size of the unit file as a large value, and if the packet loss rate of the communication method connected to the server 200 is small, the processor 120 may determine the size of the unit file as a large value. In addition, if the packet loss rate exceeds the third threshold value, the processor 120 may control the communicator 130 to transmit the first data set to the server 200 without converting the files having a size less than the first threshold value.

The processor 120 may determine the size of the unit file to be transmitted to the server 200 in consideration of both the bandwidth and the packet loss rate of the communication method connected to the server 200. In other words, the processor 120 may determine the size of the unit file to be transmitted to the server 200 as a large value, if the bandwidth of the current communication method is large and the packet loss rate is small.

In another embodiment, the processor 120 may determine the size of the unit file to be transmitted to the server 200 by using the bandwidth classification data and the packet loss rate classification data stored in the memory 110. For example, since the bandwidth of the communication method currently connected to the server 200 is a value more than a and equal to or less than b, the processor 120 may identify that the current bandwidth belongs to the first group through the bandwidth classification data. In addition, the processor 120 may determine a first size value corresponding to the first group as the size of the unit file to be transmitted to the server 200. In another example, when the bandwidth of the communication method currently connected to the server 200 is a value more than b and equal to or less than c, the processor 120 may identify that the current bandwidth belongs to the second group through the bandwidth classification data. The processor 120 may determine a second size value corresponding to the second group as the size of the unit file to be transmitted to the server 200. The second size value may be larger than the first size value.

In still another example, since the packet loss rate of the communication method connected to the server 200 is a value more than d and equal to or less than e, the processor 120 may identify that the current bandwidth belongs to the third group through the packet loss rate classification data. In addition, the processor 120 may determine the third size value corresponding to the third group as the size of the unit file to be transmitted to the server 200. In still another example, if the packet loss rate of the communication method currently connected to the server 200 is a value more than e and equal to or less than f, the processor 120 may identify that the current bandwidth belongs to the fourth group through the packet loss rate classification data. The processor 120 may determine a fourth size value corresponding to the fourth group as the size of the unit file to be transmitted to the sever 200. The fourth size value may be larger than the third size value.

In still another embodiment, the processor 120 may determine an average value of the sizes of the unit file determined by using each of the packet loss rate classification data and the bandwidth classification data as the size of the unit file to be transmitted to the server 200.

The processor 120 may set the size value of the unit file to be transmitted to the server 200 to not exceed the fourth threshold value. In other words, although the bandwidth of the communication method connected to the server 200 is large and the packet loss rate is small, the processor 120 may determine the size of the unit file within the range not exceeding the fourth threshold value. The fourth threshold value may be a predetermined value but may be changed by the user.

The processor 120 may convert (or compress) the files having a size less than the first threshold value into the determined size unit. The processor 120 may convert the files having a size less than the first threshold value into various file formats. For example, the processor 120 may determine the file format into which the file is to be converted according to the determined size unit. Specifically, the processor 120 may convert the files having a size less than the first threshold value into a format such as tar, zip, or the like according to the determined size unit.

The processor 120 may generate metadata for the first data set while converting the files. Specifically, while converting the files having a size less than the first threshold value into the determined size unit, the processor 120 may generate the metadata including information on a list of the converted files and a format of the converted files. The metadata for the first data set may further include information related to the first data set such as information on a data type and a dimension of a data space of the first data set. The processor 120 may control the communicator 130 to transmit the first data set including the converted files and the metadata for the first data set to the server 200.

The processor 120 may control the communicator 130 to transmit a signal for requesting for the second data set including a plurality of files to the server 200. In an embodiment, if it is necessary to use the second data set while performing a specific job, the processor 120 may control the communicator 130 to transmit a signal for requesting for the second data set to the server 200. In another embodiment, the processor 120 may control the communicator 130 to transmit a signal for requesting for the second data set to the server 200 by a user command. In addition, the processor 120 may receive the second data set and metadata for the second data set from the server 200 via the communicator 130. In this case, the second data set may be the same as the first data set but this is merely an embodiment, and the second data set may be a separate data set.

The processor 120 may identify whether the second data set includes the converted files based on the metadata for the second data set received from the server 200. If it is identified that the second data set includes the converted files, the processor 120 may convert the converted files into the original files by using the metadata for the second data set. Specifically, the processor 120 may convert the converted files into the original files by using the converted files included in the second data set and the format of the converted files.

The processor 120 may include one or more of a central processing unit (CPU), a microcontroller unit (MCU), a microprocessing unit (MPU), a controller, an application processor (AP), or a communication processor (CP), and an ARM processor for processing digital signals or may be defined as the corresponding term. In addition, the processor 120 may be implemented as System on Chip (SoC) or large scale integration (LSI) including the processing algorithm or may be implemented in form of a field programmable gate array (FPGA). The processor 120 may perform various functions by executing computer executable instructions stored in the memory 110. In addition, the processor 120 may include at least one of a graphics-processing unit (GPU), a neural processing unit (NPU), and a visual processing unit (VPU) which are separate AI dedicated processors, in order to perform an artificial intelligence function.

The communicator 130 may communicate with the server 200 and various devices. The communication connection of the communicator 130 with the server 200 and various devices may include communication via a third device (e.g., a repeater, a hub, an access point, a gateway, or the like).

The communicator 130 may include various communication modules to communicate with the server 200 and various devices. For example, the communicator 130 may include wireless communication modules and, for example, include a cellular communication module using at least one of LTE, LTE Advanced (LTE-A), code division multiple access (CDMA), wideband CDMA (WCDMA), universal mobile telecommunications system (UMTS), Wireless Broadband (WiBro), or global system for mobile communications (GSM). In another example, the wireless communication module may, for example, include at least one of wireless fidelity (Wi-Fi), Bluetooth, Bluetooth Low Energy (BLE), Zigbee, near field communication (NFC), magnetic secure transmission, radio frequency (RF), or body area network (BAN).

The communicator 130 may obtain the information on the communication state with the server by the control of the processor 120. Specifically, the communicator 130 may obtain information on the bandwidth and the packet loss rate of the communication method connected to the server by the control of the processor 120. For example, when the communication connection with the server 200 is performed by using a Wi-Fi module, the communicator 130 may obtain the information on the bandwidth and the packet loss rate of the Wi-Fi method currently connected to the server 200.

In addition, the communicator 130 may transmit the first data set and the metadata for the first data set to the server 200 and transmit the signal for requesting for the second data set to the server 200. In addition, the communicator 130 may receive the second data set and the metadata for the second data set from the server 200.

The display 140 may display various pieces of information according to the control of the processor 120. Particularly, the display 140 may display a message indicating that the files having a size less than the first threshold value, among the files of the first data set, are converted. In addition, the display 140 may display the generated metadata for the first data set. The display 140 may be not only implemented as a touch screen with a touch panel, but may also be implemented as a flexible display or the like.

The inputter 150 may receive a user input for controlling the electronic device 100. Particularly, the inputter 150 may include a touch panel for receiving a user touch using user's fingers or a stylus pen, a button for receiving user manipulation, and the like. In addition, the inputter 150 may be implemented as other input devices (e.g., keyboard, mouse, motion inputter, and the like).

Particularly, a user command for requesting the data set to the server 200 may be input via the inputter 150. In addition, a user command for correcting or adding the bandwidth classification data and the packet loss rate classification data stored in the memory 110 may be input via the inputter 150.

The sensor 160 may detect various pieces of state information of the electronic device 100. For example, the sensor 160 may include a movement sensor for detecting movement information of the electronic device 100 (e.g., gyro sensor, acceleration sensor, or the like), and may include a sensor for detecting position information (e.g., global positioning system (GPS) sensor), an image sensor for capturing the outside of the electronic device 100, and the like.

Particularly, the sensor 160 may include a network quality sensor capable of detecting the communications state with the server 200. The network quality sensor may detect the bandwidth and the packet loss rate of the communication method connected to the server 200. Accordingly, the processor 120 may identify the current communication state by using at least one of the communicator 130 and the network quality sensor.

Figure 3:
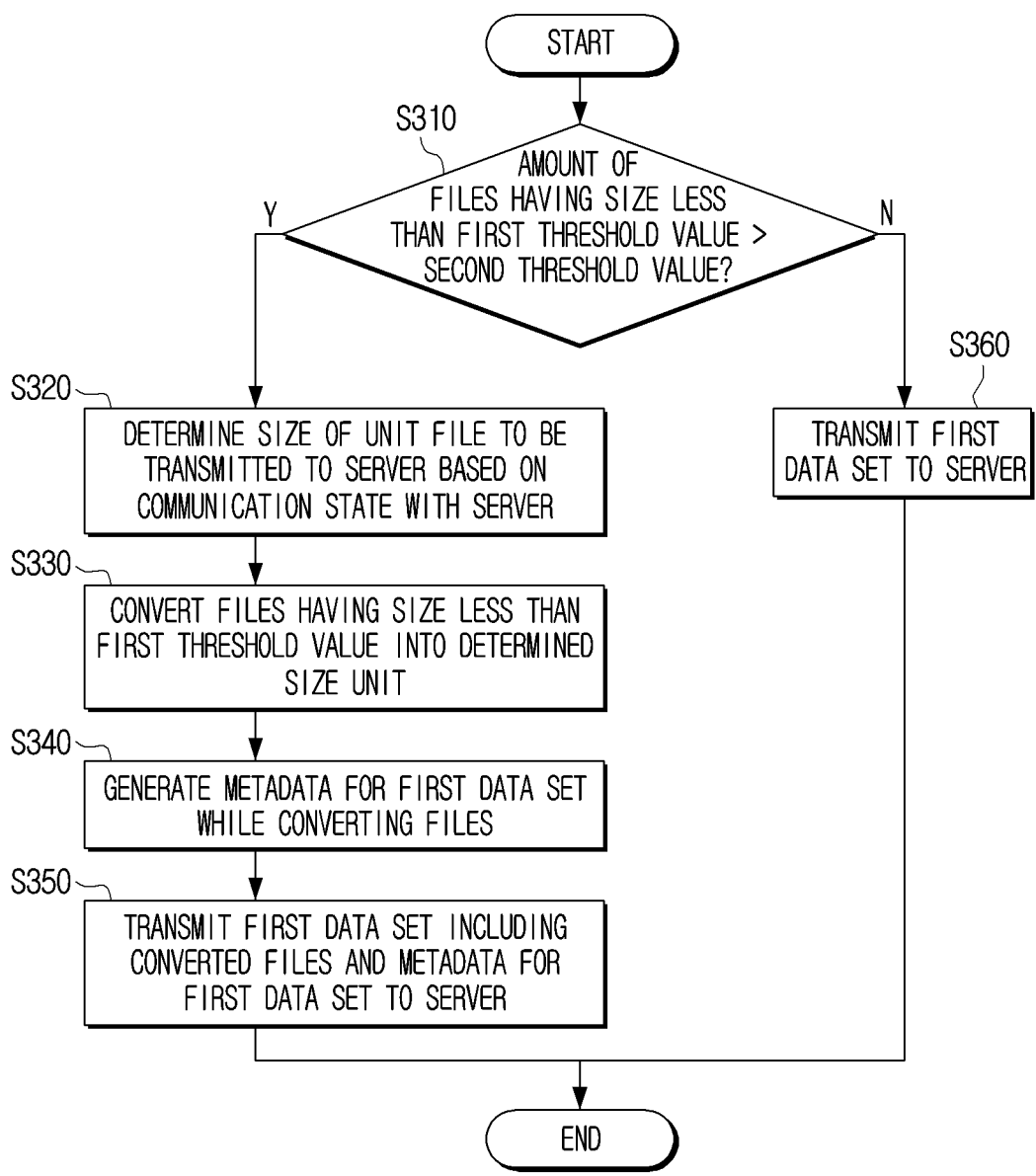
FIG. 3 is a flowchart illustrating a process in which the electronic device transmits a data set to the server according to an embodiment.

FIG. 3 is a flowchart illustrating a process in which the electronic device 100 transmits a data set to the server according to an embodiment.

First, the electronic device 100 may identify whether the amount (e.g. a number) of files having a size less than the first threshold value, among the plurality of files included in the first data set, exceeds the second threshold value (S310). The first threshold value and the second threshold value may be predetermined values, respectively, but are merely an embodiment, and may be values measured through an experiment or the like and corrected by the user.

If the number of files having a size less than the first threshold value exceeds the second threshold value, the electronic device 100 may determine the size of the unit file to be transmitted to the server 200 based on the communication state with the server 200 (S320). Specifically, the electronic device 100 may determine the size of the unit file to be transmitted to the server based on at least one of the bandwidth and the packet loss rate of the communication method connected to the server. In an embodiment, if the bandwidth of the communication method connected to the server is large, the electronic device 100 may determine the size of the unit file as a large value, and if the packet loss rate of the communication method connected to the server is small, the electronic device 100 may determine the size of the unit file as a large value.

In another embodiment, the electronic device 100 may determine the size of the unit file by using the pre-stored packet loss rate classification data and bandwidth classification data. For example, if the bandwidth of the current communication method belongs to the first group, the electronic device 100 may determine a value corresponding to the first group as the size of the unit file. In still another embodiment, if the packet loss rate of the current communication method belongs to the third group, the electronic device 100 may determine a value corresponding to the third group as the size of the unit file.

The electronic device 100 may determine the size of the unit file within values not exceeding the fourth threshold value. If it is identified that the packet loss rate exceeds the third threshold value, the electronic device 100 may transmit the first data set to the server 200 without converting the files included in the first data set. When transmitting the first data set to the server 200, the electronic device 100 may transmit the metadata indicating that the files are not converted to the server 200.

In addition, the electronic device 100 may convert the files having a size less than the first threshold value into the determined size of the unit file (S330). Specifically, the electronic device 100 may convert (or compress) the files having a size less than the first threshold value into various file formats such as tar, zip, and the like. In this case, the electronic device 100 may determine the file format according to the determined size of the unit file.

In addition, the electronic device 100 may generate the metadata for the first data set while converting the files (S340). Specifically, the electronic device 100 may generate the metadata for the first data set including at least one of the list of the converted files and the format of the converted files while converting the files. In this case, the metadata for the first data set generated by the electronic device 100 may further include information related to the first data set such as information on a data type and a dimension of a data space of the first data set. In addition, the electronic device 100 may transmit the first data set including the converted files and the metadata for the first data set to the server (S350).

If the number of files having a size less than the first threshold value is equal to or less than the first threshold value, the electronic device 100 may transmit the first data set to the server (S360). In this case, the electronic device 100 may transmit the metadata for the first data set at the same time or within a threshold time with the first data set. The metadata may include information indicating that the first data set does not include the converted files and the information related to the first data set.

Figure 4:
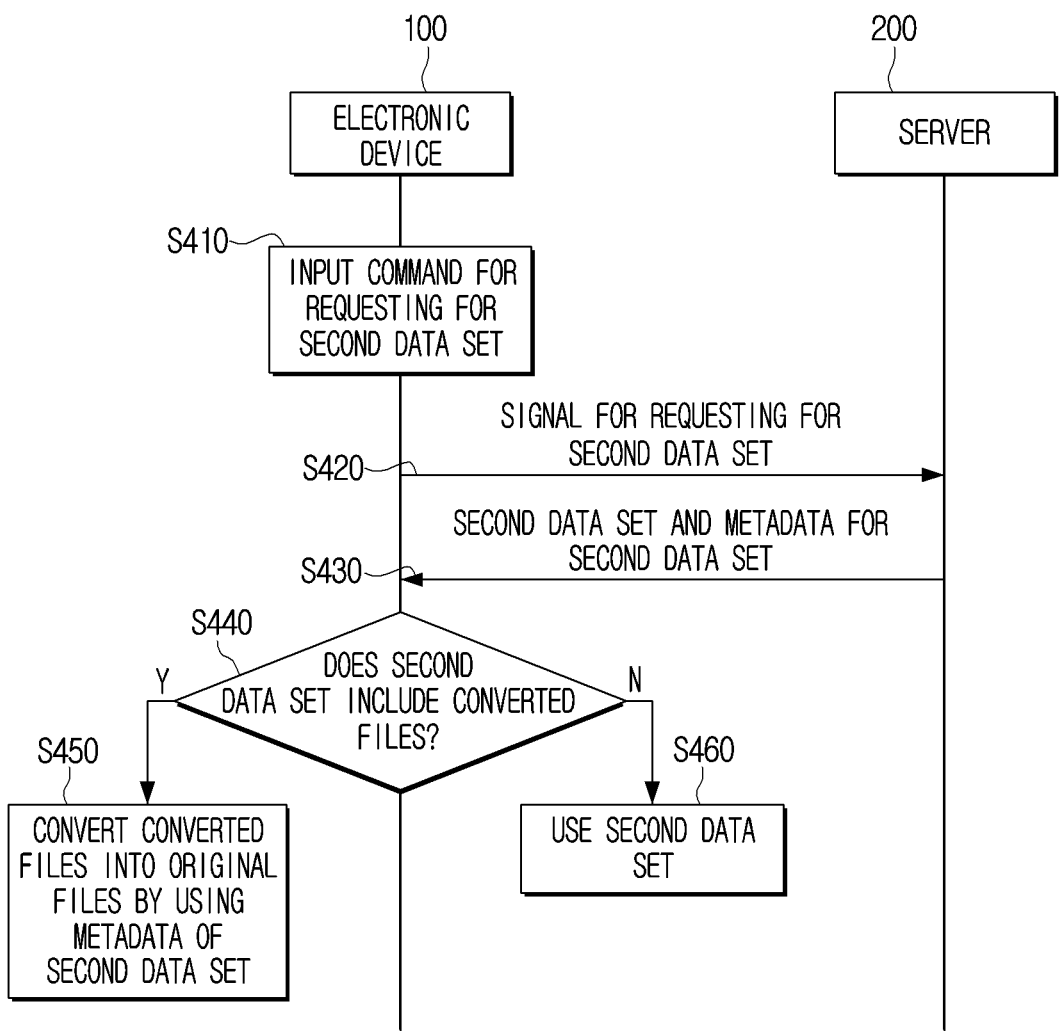
FIG. 4 is a sequence diagram illustrating a process in which the electronic device receives the data set from the server according to an embodiment.

FIG. 4 is a sequence diagram illustrating a process in which the electronic device 100 receives the data set from the server 200 according to an embodiment.

First, the electronic device 100 may receive an input of a command for requesting the second data set (S410). Specifically, the electronic device 100 may receive an input of a command for requesting the second data set from the user via the inputter (e.g., keyboard, button, mouse, microphone, or the like). In addition, the electronic device 100 may transmit the signal for requesting for the second data set to the server 200 (S420).

In another embodiment, while performing a specific operation, the electronic device 100 may determine (or identify) that the second data set is necessary to perform the specific operation. For example, while performing an operation of training a dialogue system, the electronic device 100 may determine that the second data set including additional training data is necessary to train the dialogue system. In this case, the electronic device 100 may transmit the signal for requesting for the second data set to the server 200.

The server 200 may transmit the second data set and the metadata for the second data set to the electronic device 100 in response to the received signal (S430). The server 200 may store a plurality of data sets and metadata corresponding to the plurality of data sets in advance. Accordingly, when the signal for requesting for the second data set is received from the electronic device 100, the server 200 may load the second data set and the metadata for the second data set stored in a memory of the server 200 and transmit these to the electronic device 100.

The electronic device 100 may identify whether the second data set includes the converted files based on the metadata for the second data set (S440). Specifically, the electronic device 100 may identify whether the second data set includes the converted files based on whether the metadata for the second data set includes information on the list of the converted files and the format of the converted files. If it is identified that the second data set includes the converted files, the electronic device 100 may convert the converted files into the original files by using the metadata (S450). In other words, the electronic device 100 may restore only the files in the list of the converted files into the original files. If it is identified that the second data set does not include the converted files, the electronic device 100 may use the files included in the second data set as they are.

FIG. 5 is a flowchart illustrating a method for controlling the electronic device 100 according to an embodiment.

The electronic device 100 may identify the amount of files having a size less than the first threshold value among the plurality of files included in the first data set (S510). Herein, the first threshold value may be a predetermined value or a value measured through an experiment and may be corrected by the user.

The electronic device 100 may determine the size of the unit file to be transmitted to the server based on the identified amount of files and the communication state with the server (S520). Specifically, the electronic device 100 may identify whether the amount of files having a size less than the first threshold value among the plurality of files is equal to or more than the second threshold value. If the amount of files exceeds the second threshold value, the electronic device 100 may determine the size of the unit file to be transmitted to the server based on the communication state with the server. For example, the electronic device 100 may determine the size of the unit file to be transmitted to the server based on at least one of the bandwidth and the packet loss rate of the communication method connected to the server. Specifically, if the bandwidth of the communication method connected to the server is large, the electronic device 100 may determine the size of the unit file as a large value, and if the packet loss rate of the communication method connected to the server is small, the electronic device 100 may determine the size of the unit file as a large value.

The electronic device 100 may convert the files having a size less than the first threshold value into the determined size unit and generate metadata for the first data set while converting the files (S530). Specifically, while converting the files included in the first data set, the electronic device 100 may obtain information on the format of the converted files and information on the list of the converted files included in the unit file to be transmitted to the server. The electronic device 100 may generate the metadata for the first data set including the obtained information. The metadata for the first data set may further include information related to the first data set such as information on a data type and a dimension of a data space of the first data set. The electronic device 100 may transmit the first data set including the converted files and the metadata for the first data set to the server (S540).

According to various aspects of the embodiments described above, the electronic device may perform uploading and downloading operations for data rapidly and efficiently, by uploading data on a server or downloading data from the server by various methods according to a communication state with the server a size of files included in a data set.

The electronic device 100 according to various embodiments may include at least one of, for example, a smartphone, a tablet PC, a desktop PC, a laptop PC, a netbook computer, a server, a PDA, a medical device, or a wearable device. In some embodiments, the electronic device may include at least one of, for example, a television, a refrigerator, an air conditioner, an air purifier, a set-top box, and a media box (e.g., SAMSUNG HOMESYNC™, APPLE TV™, or GOOGLE TV™).

Various embodiments may be implemented as software including instructions stored in machine (e.g., computer)-readable storage media. The machine is a device which invokes instructions stored in the storage medium and is operated according to the invoked instructions, and may include an electronic device (e.g., electronic device 100) according to embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium. For example, the "non-transitory storage medium" may include a buffer temporarily storing data.

According to an embodiment, the methods according to various embodiments may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product (e.g., downloadable app) may be at least temporarily stored or temporarily generated in a machine-readable storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. An electronic device comprising:
a memory storing a first data set comprising a first plurality of files;
a communicator comprising circuitry; and
a processor configured to:
identify whether an amount of files having a size less than a first threshold value among the first plurality of files exceeds a second threshold value;
based on the identified amount of files exceeding the second threshold value and a communication state with a server, determine a size of a unit file to be transmitted to the server;
convert the identified files having the size less than the first threshold value into the determined size unit, and generate metadata for the first data set while converting the identified files; and
control the communicator to transmit the first data set including the converted files and the metadata for the first data set to the server;
wherein the size of the unit file is determined to be a value that is related to a bandwidth of a communication connection with the server; and
wherein the size of the unit file is determined to be a value that is inversely related to a packet loss rate of the communication connection with the server.

2. The electronic device according to claim 1, wherein the processor is further configured to, based on the packet loss rate exceeding a third threshold value, control the communicator to transmit the first data set to the server without converting the files having the size less than the first threshold value.

3. The electronic device according to claim 1, wherein the processor is further configured to, based on the identified amount of files being equal to or less than the second threshold value, control the communicator to transmit the first data set to the server without converting the files having the size less than the first threshold value.

4. The electronic device according to claim 1, wherein the metadata for the first data set comprises at least one of a list of the converted files or a file format of the converted files of the first data set.

5. The electronic device according to claim 1, wherein the processor is further configured to:
 control the communicator to transmit a signal for requesting a second data set comprising a second plurality of files to the server;
 receive the second data set and metadata for the second data set from the server via the communicator; and
 identify whether the second data set includes converted files based on the metadata for the second data set.

6. The electronic device according to claim 5, wherein the processor is further configured to, based on an identification that the second data set includes the converted files, convert the converted files into original files by using the metadata for the second data set.

7. A method for controlling an electronic device including a memory storing a first data set including a plurality of files, the method comprising:
 identifying whether an amount of files having a size less than a first threshold value among the plurality of files exceeds a second threshold value;
 based on the identified amount of files exceeding the second threshold value and a communication state with a server, determining a size of a unit file to be transmitted to the server;
 converting the identified files having the size less than the first threshold value into the determined size unit, and generating metadata for the first data set while converting the identified files; and
 transmitting the first data set including the converted files and the metadata for the first data set to the server;
 wherein the size of the unit file is determined to be a value that is related to a bandwidth of a communication connection with the server; and
 wherein the size of the unit file is determined to be a value that is inversely related to a packet loss rate of the communication connection with the server.

8. The method according to claim 7, further comprising based on the packet loss rate exceeding a third threshold value, transmitting the first data set to the server without converting the files having the size less than the first threshold value.

9. The method according to claim 7, further comprising, based on the amount of files being equal to or less than the second threshold value, transmitting the first data set to the server without converting the files having a size less than the first threshold value.

* * * * *